(12) United States Patent
Kuwano et al.

(10) Patent No.: US 6,897,633 B2
(45) Date of Patent: May 24, 2005

(54) STEPPING MOTOR DRIVER

(75) Inventors: Yoshifumi Kuwano, Kiryu (JP); Akio Takemori, Kiryu (JP); Hiroaki Taka, Kiryu (JP); Yasuo Matsuda, Kiryu (JP); Yoshihiro Okumatsu, Miyazaki (JP); Atsuo Kawamura, Yokohama (JP); Yukinari Takahashi, Kiryu (JP)

(73) Assignee: Japan Servo Co., Ltd., Tokyo (JP)

( * ) Notice: Subject to any disclaimer, the term of this patent is extended or adjusted under 35 U.S.C. 154(b) by 0 days.

(21) Appl. No.: 10/795,415

(22) Filed: Mar. 9, 2004

(65) Prior Publication Data

US 2004/0178763 A1 Sep. 16, 2004

(30) Foreign Application Priority Data

Mar. 11, 2003 (JP) ............................... 2003-064300
Mar. 20, 2003 (JP) ............................... 2003-076707

(51) Int. Cl.$^7$ .............................................. H02P 8/22
(52) U.S. Cl. ..................................................... 318/685
(58) Field of Search ................................. 318/685, 696

(56) References Cited

U.S. PATENT DOCUMENTS

| | | | | |
|---|---|---|---|---|
| 4,477,757 A | * | 10/1984 | Palombo et al. | ............ 318/696 |
| 4,506,206 A | * | 3/1985 | Thommen | ................ 318/696 |
| 4,536,691 A | * | 8/1985 | Sakakibara | ............... 318/696 |
| 4,734,631 A | * | 3/1988 | Kamikura et al. | ........ 318/685 |
| 5,691,613 A | * | 11/1997 | Gutwillinger | ............ 318/500 |
| 6,271,641 B1 | * | 8/2001 | Yasohara et al. | ......... 318/685 |

FOREIGN PATENT DOCUMENTS

WO          WO 00/04632 A1      7/1999

* cited by examiner

*Primary Examiner*—Bentsu Ro
(74) *Attorney, Agent, or Firm*—Birch, Stewart, Kolasch & Birch, LLP (57) ABSTRACT

A stepping motor driver which drives a stepping motor for position and speed control. The stepping motor driver comprises: a current control means which outputs values corresponding to applied voltages; current sensors which detect phase currents; and a magnetic pole position estimation unit which uses the values corresponding to applied voltages and detected phase current values as outputs of the current sensors to obtain a magnetic pole position estimate. The magnetic pole position estimation unit calculates a magnetic pole position estimate from speed electromotive force estimates or from differences between phase currents at zero speed and detected phase current values.

19 Claims, 10 Drawing Sheets

STEPPING MOTOR DRIVER

This Nonprovisional application claims priority under 35 U.S.C. § 119(a) on patent application Ser. No(s). 2003-064300 and 2003-076707 filed in JAPAN on Mar. 11, 2003 and Mar. 20, 2003, the entire contents of which are hereby incorporated by reference.

BACKGROUND OF THE INVENTION

1. Field of the Invention

The present invention relates to a stepping motor driver which drives a stepping motor for position and speed control.

2. Description of the Prior Art

A conventional stepping motor driver operates in a position-sensorless closed loop in which the terminal voltage of a motor is detected and compared with a reference voltage to detect the magnetic pole position based on the speed electromotive force of the motor and the excitation of the motor in the magnetic pole position based on the speed electromotive force is changed and the voltage applied to the motor is adjusted according to a position error as a difference between a position command and a magnetic pole position based on the speed electromotive force.

However, since this type of stepping motor driver detects the time of polarity reversal in the speed electromotive force of a motor, the detection resolution is insufficient, for example, when a subtle excitation position variation is needed for microstepping. In addition, a multipolar stepping motor has a high fundamental frequency and as the speed increases a current phase delay due to stepping motor winding inductance becomes larger. Therefore, when the excitation is changed according to the polarity reversal position in the speed electromotive force to adjust the applied voltage according to position error variation, high speed rotation beyond the range of saturation of applied voltage is difficult.

SUMMARY OF THE INVENTION

An object of the present invention is to provide a stepping motor driver which provides high resolution in magnetic pole position detection and enables high speed rotation.

According to one aspect of the present invention, there is provided a stepping motor driver which comprises: a current control means which outputs values corresponding to applied voltages; current sensors which detect phase currents; and a magnetic pole position estimation means which has inverse function characteristic operation means of motor winding constant and speed electromotive force estimation means. Here, the magnetic pole position estimation means receives the values corresponding to applied voltages and a detected phase current values as outputs of the current sensors; the inverse function characteristic operation means receives the detected phase current value to perform the motor winding constant inverse function characteristic operation; and based on a difference between output of the inverse function characteristic operation means and the value corresponding to applied voltage, the speed electromotive force estimation means calculates speed electromotive force estimate to obtain a magnetic pole position estimate from the speed electromotive force estimates.

According to another aspect of the invention, there is provided a stepping motor driver which comprises: a current control means which outputs values corresponding to applied voltages; current sensors which detect phase currents; and a magnetic pole position estimation means which has motor winding constant characteristic operation means and difference operation means. Here, the magnetic pole position estimation means receives the values corresponding to applied voltages and detected phase current values as outputs of the current sensors; the motor winding constant characteristic operation means calculates phase current at zero speed from the value corresponding to applied voltage; the difference operation means calculates a difference between the phase current at zero speed and the detected phase current value to obtain a magnetic pole position estimate from the differences.

These stepping motor drivers make it possible to obtain a magnetic pole position estimate with high resolution at high speed in stepping motor operation so that drive characteristics equivalent to those of a motor with a position sensor can be achieved even in an ordinary stepping motor without a special sensor. Therefore, a stepping motor driver according to the present invention is less likely to cause step-out in a motor than a closed loop control system and thus provides a highly reliable motor drive system.

BRIEF DESCRIPTION OF THE DRAWINGS

The invention will be more particularly described with reference to the accompanying drawings, in which.

DETAILED DESCRIPTION OF THE PREFERRED EMBODIMENTS

The speed electromotive forces in the alpha and beta phases of a 2-phase hybrid stepping motor are expressed by Equations (1) and (2) below:

$$e_\alpha = -\Phi \omega_{re} \sin \theta_{re} \quad (1)$$

$$e_\beta = \Phi \omega_{re} \cos \theta_{re} \quad (2)$$

The voltages in the alpha and beta phases of the stepping motor are expressed by Equations (3) and (4) below:

$$V_\alpha = (R_\alpha + sL_\alpha) \cdot i_\alpha + e_\alpha \quad (3)$$

$$V_\beta = (R_\beta + sL_\beta) \cdot i_\beta + e_\beta \quad (4)$$

In Equations (1) through (4), $e_\alpha$ and $e_\beta$ represent speed electromotive forces, $i_\alpha$ and $i_\beta$ phase currents, $\theta_{re}$ a motor rotation angle in electrical degrees, $\omega_{re}$ a rotation angular speed of a motor shaft in electrical degrees, $\Phi$ a motor magnetic flux, $V_\alpha$ and $V_\beta$ applied voltages, $R_\alpha$ and $R_\beta$ winding resistances, $L_\alpha$ and $L_\beta$ winding inductances, and s a Laplace operator. Subscripts $_\alpha$ and $_\beta$ show the alpha phase and beta phase of the stepping motor, respectively.

For formulation of a state equation in brushless motor analysis, it is common that the first derivative of a speed electromotive force is zero. However, because transitional change is repeated in a stepping motor, a calculation error may be serious if the first derivatives of speed electromotive forces $e_\alpha$ and $e_\beta$ are zero.

For this reason, in the present invention, a magnetic pole position estimation unit is designed in accordance with a state equation in which the second derivatives of speed electromotive forces $e_\alpha$ and $e_\beta$ are zero. This improves estimation accuracy of the magnetic pole position estimation unit. Shown below are state equations (5) and (6) for the alpha and beta phases of the stepping motor where the second derivatives of speed electromotive forces $e_\alpha$ and $e_\beta$ are zero:

$$\frac{d}{dt}\begin{bmatrix} i_\alpha \\ e_\alpha \\ \dot{e}_\alpha \end{bmatrix} = \begin{bmatrix} -\frac{R_\alpha}{L_\alpha} & -\frac{1}{L_\alpha} & 0 \\ 0 & 0 & 1 \\ 0 & 0 & 0 \end{bmatrix} \begin{bmatrix} i_\alpha \\ e_\alpha \\ \dot{e}_\alpha \end{bmatrix} + \begin{bmatrix} \frac{1}{L_\alpha} \\ 0 \\ 0 \end{bmatrix} V_\alpha \quad (5)$$

$$\frac{d}{dt}\begin{bmatrix} i_\beta \\ e_\beta \\ \dot{e}_\beta \end{bmatrix} = \begin{bmatrix} -\frac{R_\beta}{L_\beta} & -\frac{1}{L_\beta} & 0 \\ 0 & 0 & 1 \\ 0 & 0 & 0 \end{bmatrix} \begin{bmatrix} i_\beta \\ e_\beta \\ \dot{e}_\beta \end{bmatrix} + \begin{bmatrix} \frac{1}{L_\beta} \\ 0 \\ 0 \end{bmatrix} V_\beta \quad (6)$$

When speed electromotive forces $e_\alpha$ and $e_\beta$ are estimated in accordance with Equations (5) and (6), magnetic pole position $\theta$ of the stepping motor can be estimated in accordance with Equation (7):

$$\theta = \tan^{-1}\frac{-e_\alpha}{e_\beta} \quad (7)$$

Figure 1:
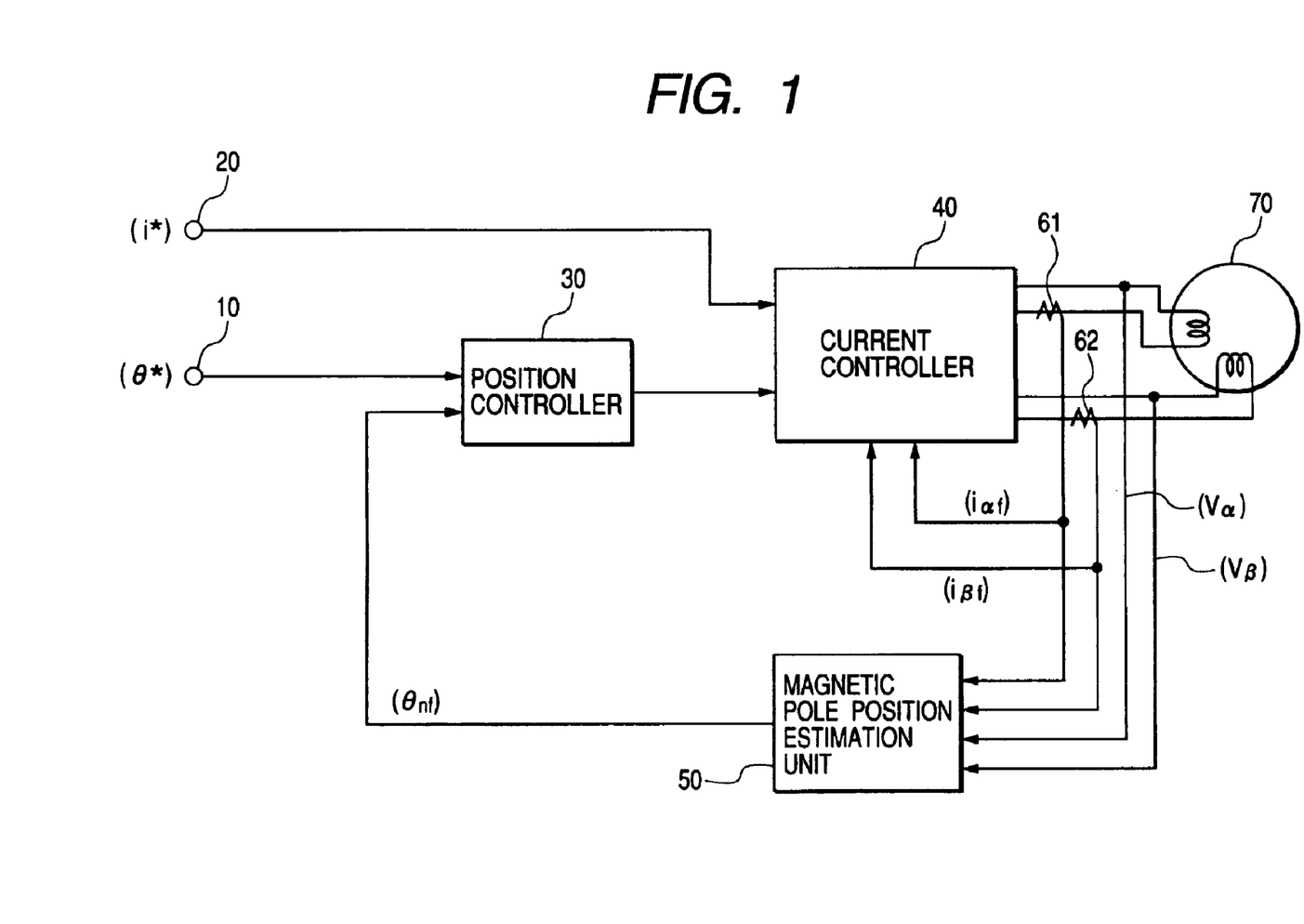
FIG. 1 is a block diagram showing a stepping motor driver according to a first embodiment of the present invention.

FIG. 1 shows the structure of a 2-phase hybrid stepping motor according to a first embodiment of the present invention. Referring to FIG. 1, a magnetic pole position estimation unit 50 generates a magnetic pole position estimate $\theta_{nf}$ in accordance with Equations (5) through (7). Specifically, the magnetic pole position estimation unit 50 receives output (namely detected phase current value $i_{\alpha f}$) of a current sensor 61 for detection of the alpha phase current of a stepping motor 70, output (namely detected phase current value $i_{\beta f}$) of a current sensor 62 for detection of the beta phase current and alpha phase voltage $V_\alpha$ and beta phase voltage $V_\beta$ which are applied to the stepping motor 70, and generates a magnetic pole position estimate $\theta_{nf}$. A position controller 30 receives position command $\theta^*$ which has entered a position command input terminal 10 and the magnetic pole position estimate $\theta_{nf}$. A current controller 40 receives output of the position controller 30 and current amplitude command i* which has entered the current amplitude command input terminal 20, and outputs voltages $V_\alpha$ and $V_\beta$ which are applied to the stepping motor 70.

Figure 2:
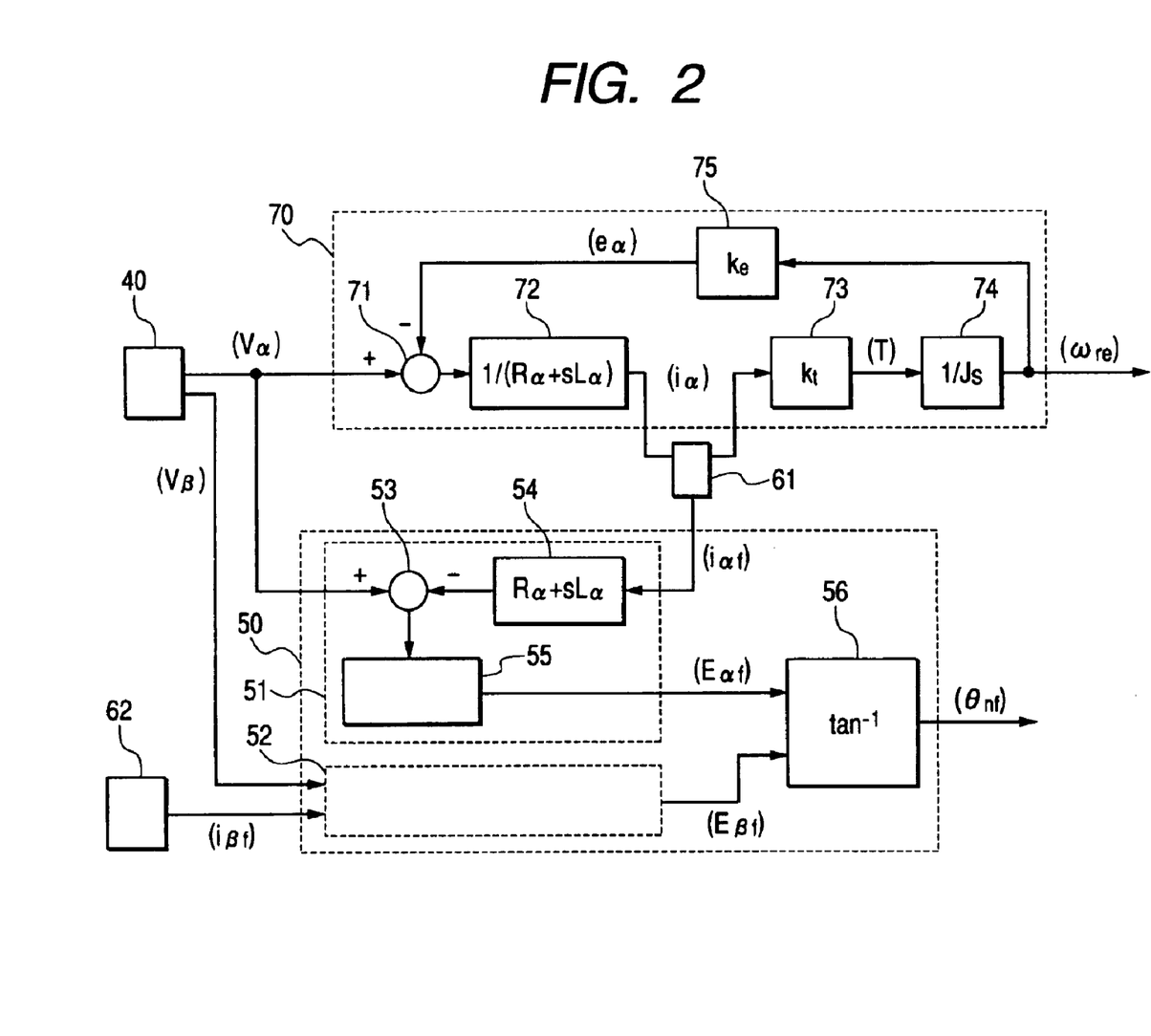
FIG. 2 is a block diagram showing the relationship between a stepping motor in the driver shown in FIG. 1 and a magnetic pole position estimation unit.

Next, the process of magnetic pole position estimation is explained in detail referring to FIG. 2. FIG. 2 shows the relationship between the stepping motor 70 and the magnetic pole position estimation unit 50. In the figure, the motor is a 2-phase stepping motor and only one phase (alpha phase) of the motor is illustrated; and only one phase (alpha phase) of the magnetic pole position estimation unit is illustrated in detail and the other phase (beta phase) is illustrated in a simplified form. Since the stepping motor has characteristics similar to those of a permanent magnet synchronous motor as mentioned above, this block diagram is based on the assumption that the analysis method for synchronous motors can be used to grasp and analyze the behavior of the stepping motor.

The stepping motor 70 receives alpha phase voltage $V_\alpha$ from the current controller 40 and generates motor shaft rotational angular speed $\omega_{re}$. Specifically, inside the stepping motor 70, a speed electromotive force $e_\alpha$ which is proportional to electromotive force constant 75 ($k_e$) is generated for the motor shaft rotational angular speed $\omega_{re}$ and fed back to an adder 71. The adder 71 calculates the difference between the alpha phase voltage $V_\alpha$ and the speed electromotive force $e_\alpha$ and adds it to a motor winding constant 72 so that phase current $i_\alpha$ flows through an alpha phase winding. The phase current $i_\alpha$ is converted into shaft torque T by torque constant 73 ($k_t$). The shaft torque T is converted into motor shaft rotational angular speed $\omega_{re}$ by means of a motor mechanical element 74 (approximated to 1/Js in FIG. 2).

In the structure of the stepping motor (alpha phase) shown in FIG. 2, the phase current $i_\alpha$ flows through the alpha phase winding and the current sensor 61 can detect the phase current $i_\alpha$.

In the magnetic pole position estimation unit 50, an alpha phase speed electromotive force estimation section 51 generates an alpha phase speed electromotive force estimate $E_{\alpha f}$. Specifically, the alpha phase speed electromotive force estimation section 51 receives a detected phase current value $i_{\alpha f}$ and alpha phase voltage $V_\alpha$. A characteristic operator 54 of motor winding constant inverse function multiplies the detected phase current value $i_{\alpha f}$ by a factor of $(R_\alpha + sL_\alpha)$. And, an adder 53 calculates the difference between output of the inverse function characteristic operator 54 and alpha phase voltage $V_\alpha$. A smoothing circuit 55 which suppresses AC ripples receives the output of the adder 53 and calculates alpha phase speed electromotive force estimate $E_{\alpha f}$ in accordance with Equation (5). Likewise, with regard to the beta phase of the stepping motor 70, a beta phase speed electromotive force estimation section 52 calculates beta phase speed electromotive force estimate $E_{\beta f}$ in accordance with Equation (6), though not shown in detail in FIG. 2. In addition, a position operator 56 converts the speed electromotive force estimates $E_{\alpha f}$ and $E_{\beta f}$ into a magnetic pole position estimate $\theta_{nf}$ in accordance with Equation (7) and sends the magnetic pole position estimate $\theta_{nf}$ to the position controller 30 as an output of the magnetic pole position estimation unit 50.

Figure 3:
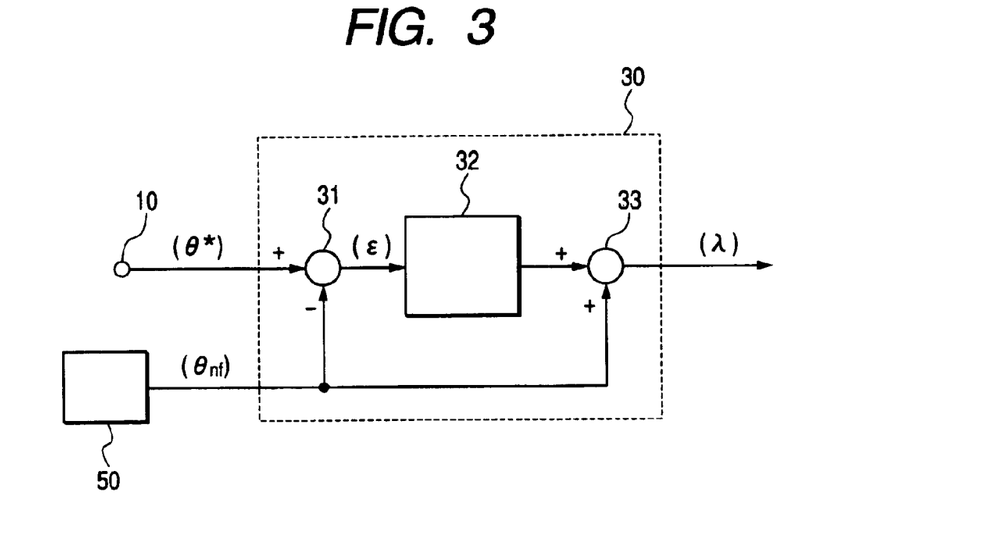
FIG. 3 is a block diagram showing a position controller in the driver shown in FIG. 1.

Next, the position controller 30 is explained in detail. FIG. 3 shows the structure of the position controller 30. The position controller 30 receives position command $\theta^*$ and magnetic pole position estimate $\theta_{nf}$. An adder 31 calculates the difference between position command $\theta^*$ and magnetic pole position estimate $\theta_{nf}$, namely a position error $\epsilon$ and gives the position error $\epsilon$ to a position compensator 32. The position compensator 32 amplifies the position error $\epsilon$ and an adder 33 adds the output of the position compensator 32 to the magnetic pole position estimate $\theta_{nf}$ to output position control signal $\lambda$.

The stepping motor 70 rotates according to position command $\theta^*$. When a command is given, a position error $\epsilon$ occurs temporarily. In the structure shown in FIG. 3, when a position error $\epsilon$ occurs, the position control signal $\lambda$ is magnetic pole position estimate $\theta_{nf}$ plus an amplified value of position error $\epsilon$. For example, if the position compensator 32 is a proportional element with 1× gain, the position control signal $\lambda$ is equal to the position command $\theta^*$. Usually, a PI compensator is used for the position compensator 32. In this case, when a position error $\epsilon$ occurs continuously, the position control signal $\lambda$ increases with time.

Figure 4:
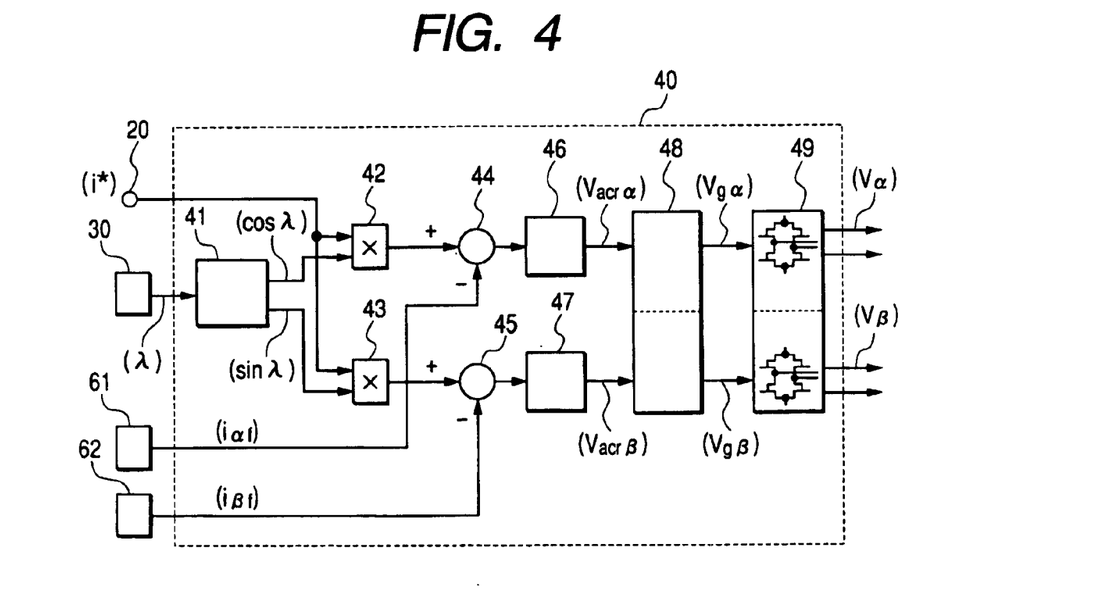
FIG. 4 is a block diagram showing a current controller in the driver shown in FIG. 1.

Next, the current controller 40 is explained in detail. FIG. 4 shows the structure of the current controller 40. The current controller 40 receives external current amplitude command i* from the current amplitude command input terminal 20, position control signal $\lambda$ and detected phase current values $i_{\alpha f}$ and $i_{\beta f}$ and outputs voltages $V_\alpha$ and $V_\beta$. Specifically, an excitation signal generator 41 generates 2-phase alternating currents cos $\lambda$ and sin $\lambda$ as reference signals for voltages $V_\alpha$ and $V_\beta$ using the position control signal $\lambda$ as a position signal. Multipliers 42 and 43 generate current commands i*cos $\lambda$ and i*sin $\lambda$ by multiplying the 2-phase alternating currents cos $\lambda$ and sin $\lambda$ by external current amplitude command i*. Adders 44 and 45 calculate the current difference between current commands i*cos $\lambda$ and $i_{\alpha f}$ and the current difference between i*sin $\lambda$ and $i_{\beta f}$, respectively. Current compensators 46 and 47 amplify these current differences and add the amplified ones to a PWM (pulse width modulator) 48. The PWM 48 performs pulse-width modulation of output of the current compensator 46, namely control voltage $V_{acr\alpha}$ to generate inverter drive signal $V_{g\alpha}$ and also performs pulse width modulation of output of the current compensator 47, namely control voltage $V_{acr\beta}$ to generate inverter drive signal $V_{g\beta}$. An inverter 49 outputs alpha and beta phase voltages $V_\alpha$ and $V_\beta$ according to inverter drive signals $V_{g\alpha}$ and $V_{g\beta}$, respectively.

In other words, the current controller 40 controls currents in a way to make the difference between the current command and the phase current small, and also determines the excitation position of the stepping motor 70 according to position control signal $\lambda$. This means that the stepping position of the stepping motor 70 and the motor excitation position with rise in the speed can be adjusted using position control signal $\lambda$.

The current controller 40 constitutes a current control means, the characteristic operator 54 constitutes an inverse function characteristic operation means, the adder 53 and the smoothing circuit 55 constitute speed electromotive force estimation means, and the magnetic pole position estimation unit 50 constitutes a magnetic pole position estimation means.

When the stepping motor 70 is treated as a permanent magnet synchronous motor, speed electromotive force estimates $E_{\alpha f}$ and $E_{\beta f}$ as estimated values of speed electromotive forces $e_\alpha$ and $e_\beta$ are obtained as follows. The inverse function characteristic operator 54 receives detected phase current values $i_{\alpha f}$ and $i_{\beta f}$ and carries out characteristic operation of motor winding constant inverse function; and the smoothing circuit 55 smoothes the difference between the output of the inverse function characteristic operator 54 and applied voltages $V_\alpha$ and $V_\beta$. Magnetic pole position estimate $\theta_{nf}$ is calculated from the speed electromotive force estimates $E_{\alpha f}$ and $E_{\beta f}$ in accordance with Equation (7) and a comparison is made between magnetic pole position estimate $\theta_{nf}$ and position command $\theta^*$ to control the excitation timing properly so that step-out is prevented and vibration is reduced in stepping motor operation.

For the magnetic pole position estimation unit 50, the characteristics of the smoothing circuit 55 must be determined. Since the motor shaft rotational angular speed $\omega_{re}$ (speed electromotive force fundamental frequency) is high in the stepping motor 70, it is necessary to estimate the magnetic pole position $\theta$ at high speed. Therefore, in the present invention, the magnetic pole position estimation unit 50 uses a discrete system to deal with estimation operation and in order to accelerate convergence, pole placement is made in finite settling time.

When Equations (6) and (7) are made discrete, for example, by Euler's method, the gain of the smoothing circuit 55 is expressed by Equation (8):

$$k_1 = -\frac{2L}{T}, k_2 = -\frac{L}{T^2} \qquad (8)$$

where T represents a sampling period L represents a winding inductance (L=$L_\alpha$=$L_\beta$).

As a consequence, magnetic pole position estimate $\theta_{nf}$ is obtained with minimized estimation lag. Because continuously changing speed electromotive forces $e_\alpha$ and $e_\beta$ are estimated, the resolution in magnetic pole position estimate $\theta_{nf}$ is high though it relies on the operation accuracy of the discrete system. Thus, even in a drive system which handles finer angles than the basic resolution of the stepping motor 70, closed-loop operation with magnetic pole position estimate $\theta_{nf}$ is possible.

Furthermore, the magnetic pole position estimation unit 50, which has the characteristic of finite time settling, reduces time lag in magnetic pole position estimation so that it can not only estimate sinusoidal position change but make an estimation of magnetic pole position $\theta$ with less error even when pulse voltage variation is sharp. Therefore, the unit is useful for normal stepping operation with a low resolution.

In addition, since position command $\theta^*$ and magnetic pole position estimate $\theta_{nf}$ are used to control the motor excitation position, a current lag caused by a rotation speed rise can be compensated for, permitting high speed rotation of the stepping motor 70.

Inverter drive signals $V_{g\alpha}$ and $V_{g\beta}$ may be entered into the magnetic pole position estimation unit 50 instead of voltages $V_\alpha$ and $V_\beta$.

Regarding applied voltages $V_\alpha$ and $V_\beta$ and detected phase current values $i_{\alpha f}$ and $i_{\beta f}$, it is possible that coordinate transformation from multi-phase to 2-phase is made to obtain a 2-phase equivalent signal and the 2-phase equivalent signal is entered as values corresponding to applied voltages and detected phase current values into the magnetic pole position estimation means. Therefore, the present invention can be applied to stepping motors with different phases.

Figure 5:
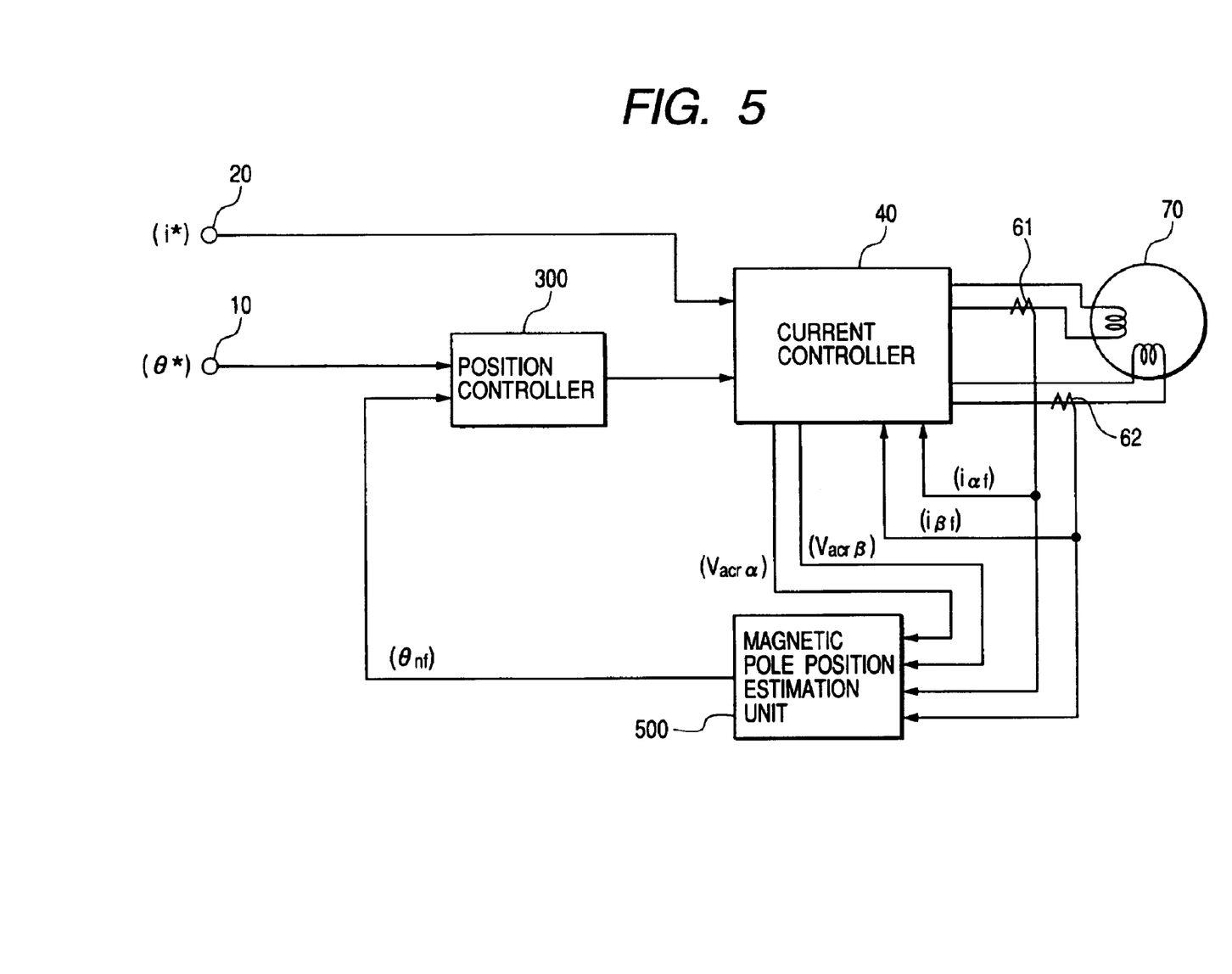
FIG. 5 is a block diagram showing a stepping motor driver according to a second embodiment of the present invention.

FIG. 5 shows the structure of a 2-phase hybrid stepping motor driver according to a second embodiment of the present invention. In the driver shown in FIG. 5, the current controller 40 is the same as in the driver shown in FIG. 1 and the position controller and magnetic pole position estimation unit are different from those in the driver in FIG. 1.

Figure 6:
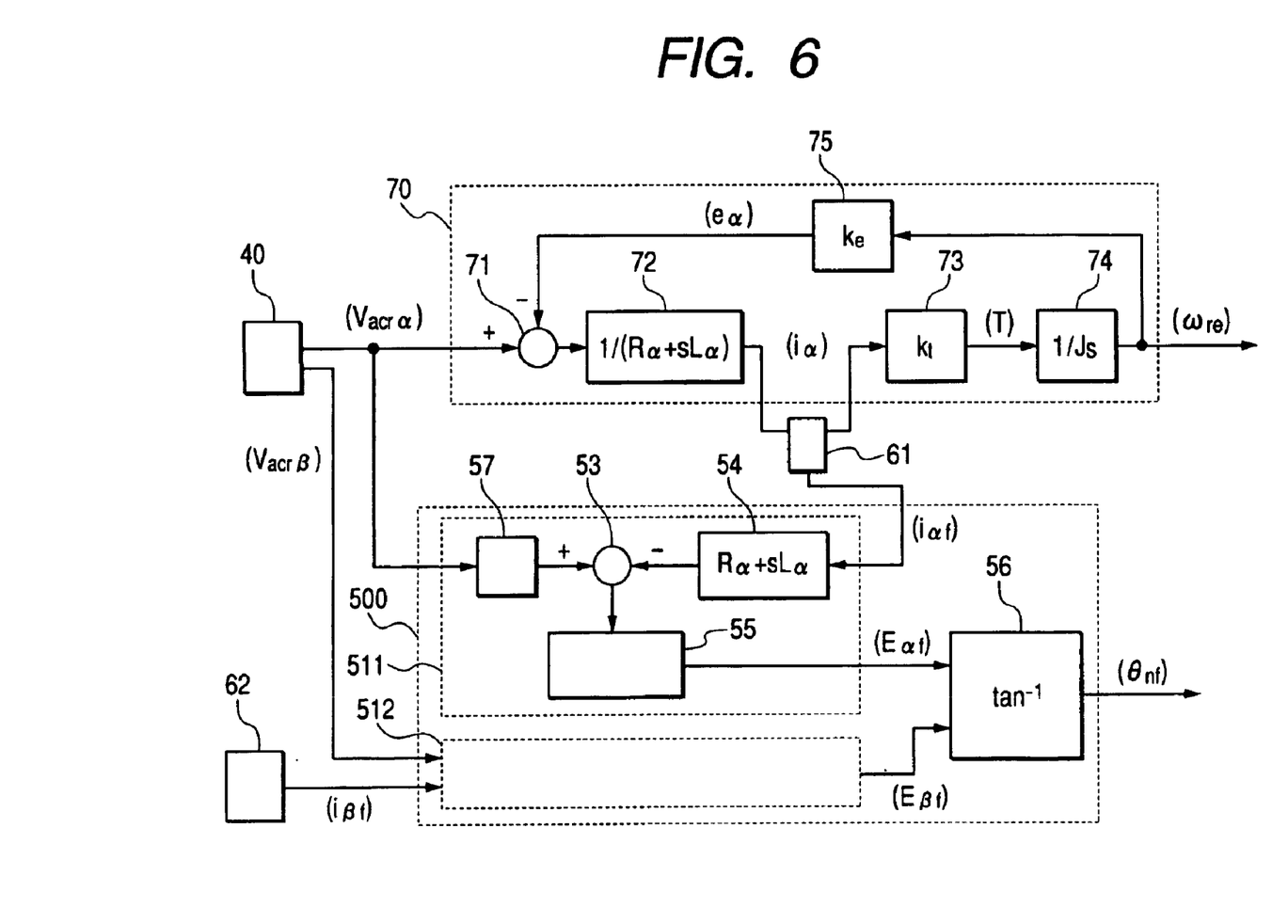
FIG. 6 is a block diagram showing the relationship between a stepping motor in the driver shown in FIG. 5 and a magnetic pole position estimation unit.
Figure 7:
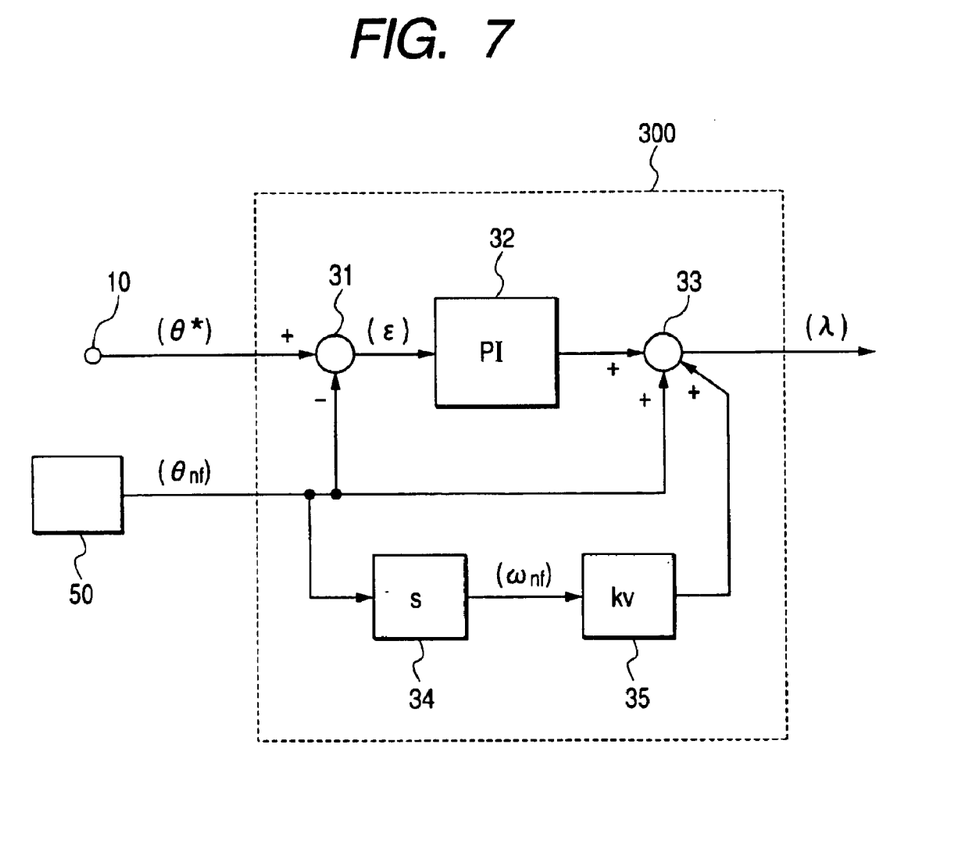
FIG. 7 is a block diagram showing a position controller in the driver shown in FIG. 5.

While the magnetic pole position estimation unit 50 of the driver in FIG. 1 receives voltages $V_\alpha$ and $V_\beta$ and detected phase current values $i_{\alpha f}$ and $i_{\beta f}$, the magnetic pole position estimation unit 500 of the driver in FIG. 5 receives control voltages $V_{acr\alpha}$ and $V_{acr\beta}$ and detected phase current values $i_{\alpha f}$ and $i_{\beta}$f. The control voltages $V_{acr\alpha}$ and $V_{acr\beta}$ are proportional to the voltages $V_\alpha$ and $V_\beta$ and as shown in FIG. 6, a coefficient multiplier 57 is added inside an alpha phase speed electromotive force estimation section 511. A beta phase speed electromotive force estimation section 512 is structurally the same as the alpha phase speed electromotive force estimation section 511 and its detail is omitted in FIG. 6.

The position controller of the driver in FIG. 1 adds an amplified value of position error $\epsilon$ to magnetic pole position estimate $\theta_{nf}$ to obtain position control signal $\lambda$. On the other hand, the position controller 300 of the driver in FIG. 5 adds an amplified value of position error $\epsilon$, and magnetic pole position estimate $\theta_{nf}$ differentiated by the differentiator 34 and multiplied by the coefficient multiplier 35, to magnetic pole position estimate $\theta_{nf}$ to obtain position control signal $\lambda$. This process is intended to adjust the excitation position of the stepping motor 70 in response to change in speed.

Here, the magnetic pole position estimation unit 500 constitutes a magnetic pole position estimation means.

Described next is a 2-phase hybrid stepping motor driver according to another embodiment of the present invention.

The alpha and beta phase speed electromotive forces $e_\alpha$, $e_\beta$ of the 2-phase hybrid stepping motor are expressed by Equations (9) and (10), respectively:

$$e_\alpha = \Phi\omega_{re}\cos\theta_{re} \quad (9)$$

$$e_\beta = \Phi\omega_{re}\sin\theta_{re} \quad (10)$$

Although Equations (9) and (10) express speed electromotive forces like Equations (1) and (2), they redefine speed electromotive forces with a different angle reference for the sake of convenience.

The voltage equations of the alpha and beta phases of the stepping motor are expressed by Equations (11) and (12):

$$V_\alpha = (R_\alpha + sL_\alpha)\cdot i_\alpha + e_\alpha = Z_\alpha i_\alpha + e_\alpha \quad (11)$$

$$V_\beta = (R_\beta + sL_\beta)\cdot i_\beta + e_\beta = Z_\beta i_\beta + e_\beta \quad (12)$$

where motor winding constant $Z_\alpha = R_\alpha + sL_\alpha$, $Z_\beta = R_\beta + sL_\beta$.

According to Equations (11) and (12), when the stepping motor is in a zero speed (halt) state, speed electromotive forces $e_\alpha$ and $e_\beta$ are zeros; thus, the relation between applied voltage $V_\alpha$ ($V_\beta$) and phase current $i_\alpha$ ($i_\beta$) is expressed by Equation (13) (Equation (14)) when the same voltage as expressed by Equation (11) (Equation (12)) is applied:

$$V_\alpha = (R_\alpha + sL_\alpha)\cdot i_{0\alpha} = Z_\alpha i_{0\alpha} \quad (13)$$

$$V_\beta = (R_\beta + sL_\beta)\cdot i_{0\beta} = Z_\beta i_{0\beta} \quad (14)$$

where $i_{0\alpha}$ and $i_{0\beta}$ represent phase currents at zero speed.

Subtraction of Equation (13) from Equation (11) leads to Equation (15):

$$e_\alpha = (R_a + sL_\alpha)\cdot(i_{0\alpha} - i_\alpha) \quad (15)$$

$$= R_\alpha(i_{0\alpha} - i_\alpha) + sL_\alpha(i_{0\alpha} - i_\alpha)$$

$$= R_\alpha(i_{0\alpha} - i_\alpha) + sL_\alpha\cdot(i_{0\alpha} - i_\alpha) + L_\alpha s(i_{0\alpha} - i_\alpha)$$

Similarly, subtraction of Equation (14) from Equation (12) leads to Equation (16):

$$e_\beta = (R_\beta + sL_\beta)\cdot(i_{0\beta} - i_\beta) \quad (16)$$

$$= R_\beta(i_{0\beta} - i_\beta) + sL_\beta(i_{0\beta} - i_\beta)$$

$$= R_\beta(i_{0\beta} - i_\beta) + sL_\beta\cdot(i_{0\beta} - i_\beta) + L_\beta s(i_{0\beta} - i_\beta)$$

Assuming that phase current differences $i_{0\alpha}\,i_\alpha$ and $i_{0\beta}-i_\beta$ are respectively $I_m\cos\theta_{re}$ and $I_m\sin\theta_{re}$ and $L_\alpha = L_\beta = L =$ constant, $R_\alpha = R_\beta = R =$ constant, Equations (15) and (16) are transformed into Equations (17) and (18), respectively:

$$E_{\alpha f} = RI_m\cos\theta_{re} + L\cdot sI_m\cdot\cos\theta_{re} - \omega_{re}LI_m\sin\theta_{re} \quad (17)$$

$$= [RI_m + L\cdot sI_m]\cdot\cos\theta_{re} - \omega_{re}LI_m\sin\theta_{re}$$

$$= \sqrt{(RI_m + L\cdot sI_m)^2 + (\omega_{re}LI_m)^2}\,\cos(\theta_{re} + \phi)$$

$$E_{\beta f} = RI_m\sin\theta_{re} + L\cdot sI_m\cdot\sin\theta_{re} + \omega_{re}LI_m\cos\theta_{re} \quad (18)$$

$$= [RI_m + L\cdot sI_m]\cdot\sin\theta_{re} + \omega_{re}LI_m\cos\theta_{re}$$

$$= \sqrt{(RI_m + L\cdot sI_m)^2 + (\omega_{re}LI_m)^2}\,\sin(\theta_{re} + \phi)$$

Here, Equations (17) and (18), phase angle $\Phi = \tan^{-1}\{\omega_{re}L/(R+LsI_m)\}$ Therefore, magnetic pole position estimate $\theta_{nf}$ can be calculated from the ratio of alpha and beta phase speed electromotive forces $E_{\alpha f}$ and $E_{\beta f}$ as shown in Equation (19):

$$\theta_{nf} = \tan^{-1}(E_{\beta f}/E_{\alpha f}) = \theta_{re} + \Phi \quad (19)$$

Based on the assumption, $\theta_{re} = \tan^{-1}\{(i_{0\beta}-i_\beta)/(i_{0\alpha}\,i_\alpha)\}$ holds and thus Equation (19) may be transformed into Equation (20):

$$\theta_{nf} = \tan^{-1}\left(\frac{(i_{0\beta} - i_\beta)}{(i_{0\alpha} - i_\alpha)}\right) + \tan^{-1}\left(\frac{\omega_{re}L}{(R - LsI_m)}\right) \quad (20)$$

$$\cong \tan^{-1}\left(\frac{(i_{0\beta} - i_\beta)}{(i_{0\alpha} - i_\alpha)}\right) + \tan^{-1}\left(\frac{\omega_{re}L}{R}\right)$$

Therefore, when phase currents at zero speed $i_{0\alpha}$ and $i_{0\beta}$ and phase currents $i_\alpha$ and $i_\beta$ in rotation are detected, magnetic pole position estimate $\theta_{nf}$ can be obtained.

Figure 8:
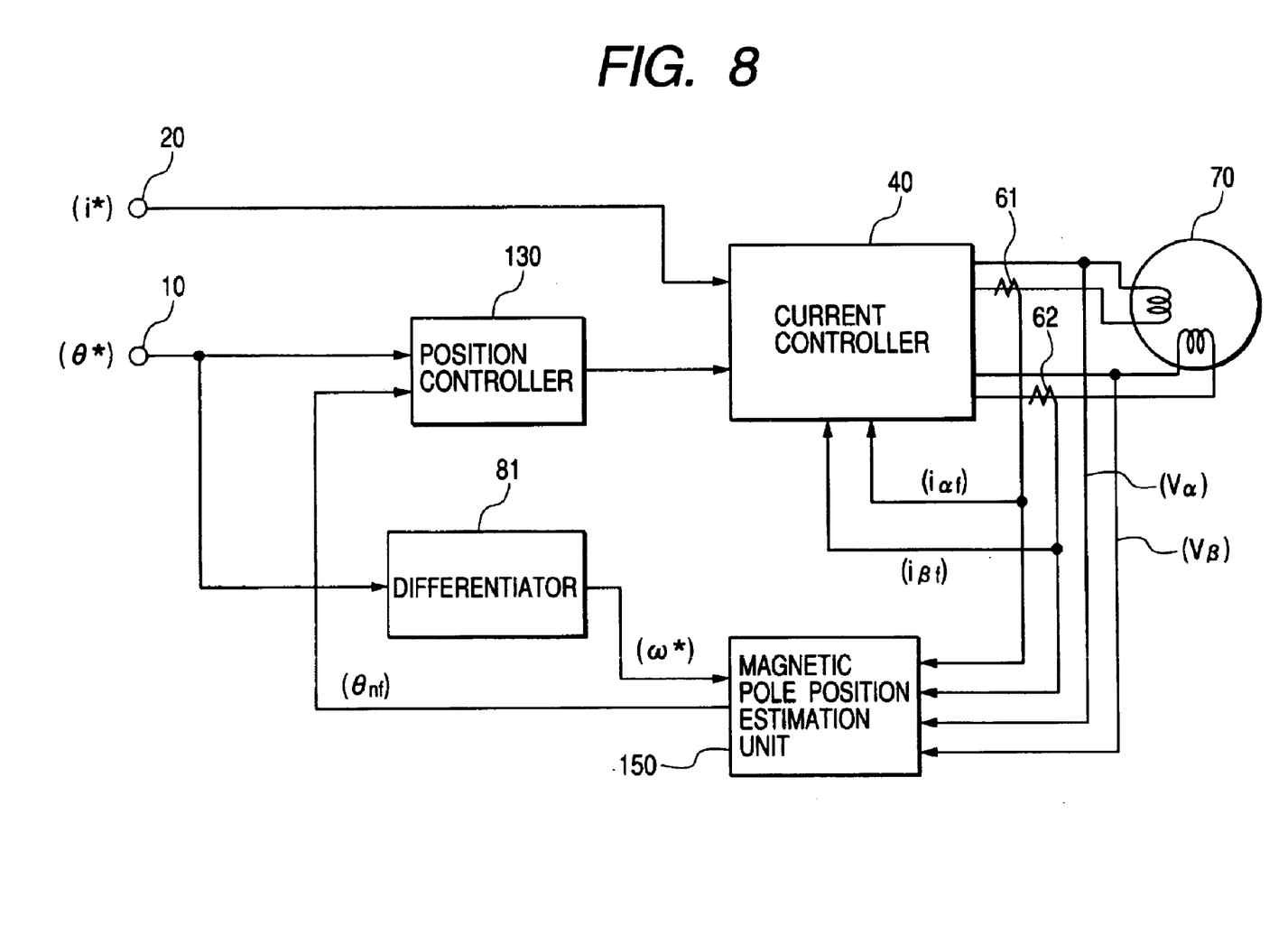
FIG. 8 is a block diagram showing a stepping motor driver according to a third embodiment of the present invention.

FIG. 8 shows the structure of a stepping motor driver according to a third embodiment of the present invention. Referring to FIG. 8, a magnetic pole position estimation unit 150 receives detected phase current values $i_{\alpha f}$ and $i_{\beta f}$, voltages $V_\alpha$, and $V_\beta$ and speed command $\omega^*$ obtained by differentiation of position command $\theta^*$ by a differentiator 81 and generates magnetic pole position estimate $\theta_{nf}$. A position controller 130 receives position command $\theta^*$ which has entered a position command input terminal 10, and magnetic pole position estimate $\theta_{nf}$. A current controller 40 receives output of a position controller 130 and current amplitude command i* which has entered a current amplitude command input terminal 20, and outputs alpha and beta phase voltages $V_\alpha$ and $V_\beta$ to be applied to the stepping motor 70.

Figure 9:
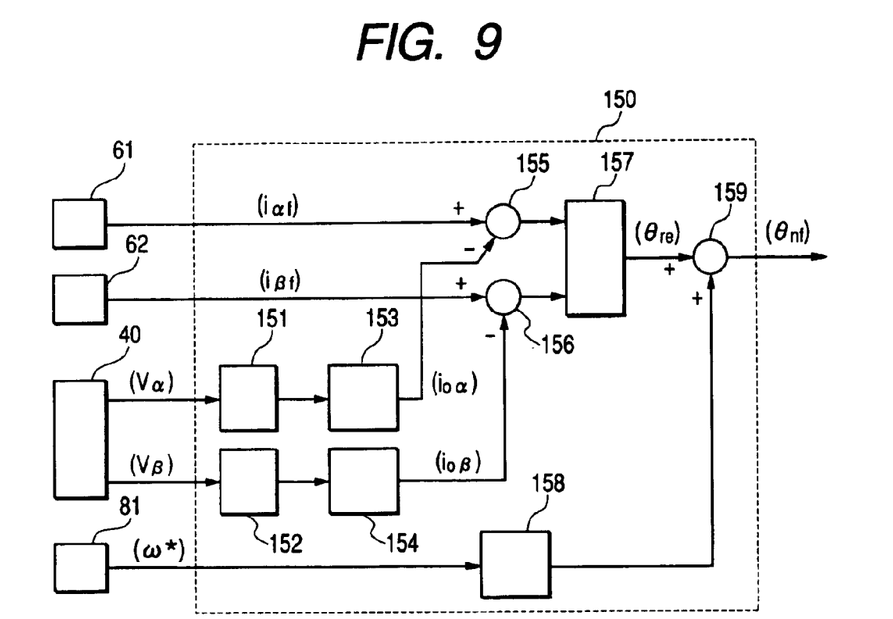
FIG. 9 is a block diagram showing a magnetic pole position estimation unit in the driver shown in FIG. 8.

FIG. 9 shows the structure of a magnetic pole position estimation unit 150. Coefficient multipliers 151 and 152 respectively receive voltages $V_\alpha$ and $V_\beta$, and motor winding constant characteristic operators 153 and 154 respectively receive output of the coefficient multipliers 151 and 152 to obtain phase currents at zero speed $i_{0\alpha}$ and $i_{0\beta}$. Adders 155 and 156 respectively receive detected phase current values $i_{\alpha f}$ and $i_{\beta f}$ through one of the input terminals and receive phase currents at zero speed $i_{0\alpha}$ and $i_{0\beta}$ through the other input terminal to obtain differences between phase currents at zero speed $i_{0\alpha}$ and $i_{0\beta}$ and detected phase current values $i_{\alpha f}$ and $i_{\beta f}$ (which depend on phase currents $i_\alpha$ and $i_\beta$). An arctangent operator 157 receives output of the adders 155 and 156 to calculate motor rotation angle $\theta_{re}$ as represented by the first term of Equation (20). On the other hand, a phase angle operator 158 uses motor speed command $\omega^*$ to make a calculation of the second term of Equation (20). An adder 159 adds the second term of Equation (20) to the first term of Equation (20), where the first term represents motor rotation speed $\theta_{re}$ and the second term represents current phase angle $\Phi$ with respect to the motor rotation speed as generated by the winding time constant, thus outputting magnetic pole position estimate $\theta_{nf}$.

Here, since motor winding constant characteristic operators 153 and 154 are to output phase currents at zero speed $i_{0\alpha}$ and $i_{0\beta}$ (values proportional to phase currents at zero speed) respectively, they each consist of a series circuit having a resistor and a capacitor arranged so as to provide the same time constant as the motor winding constant, where the terminal voltage of the capacitor is their output. The relation between phase current at zero speed $i_{0\alpha}$ and capacitor terminal voltage $V_c$ is expressed by Equation (21) and therefore the gain of the coefficient multipliers 151 and 152 should be 1/R:

$$v_c = \frac{\frac{1}{sC}}{r + \frac{1}{sC}} V_\alpha = \frac{1}{1+sCr} V_\alpha, \; i_{0\alpha} = \frac{V_\alpha}{R+sL} = \frac{1}{R}\left(\frac{1}{1+\frac{sL}{R}}\right) V_\alpha \quad (21)$$

$$\therefore i_{0\alpha} = \frac{1}{R} v_c$$

where C represents the capacitance of the capacitor used in the winding constant characteristic operators 153 and 154 and r represents the resistance of the resistor used in the winding constant characteristic operators 153 and 154. Here the constant is determined in a way to satisfy the relation L/R=Cr.

Figure 10:
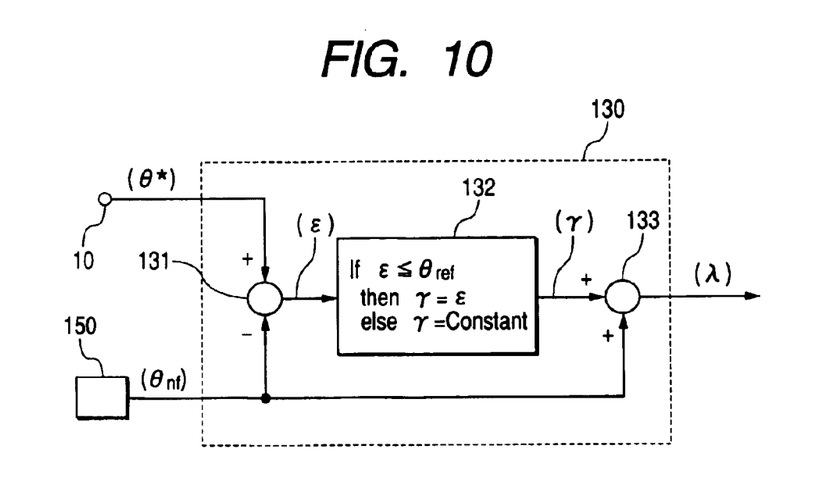
FIG. 10 is a block diagram showing a position controller in the driver shown in FIG. 8.

Next, the position controller 130 is explained in detail. FIG. 10 shows the structure of the position controller 130. The position controller 130 receives position command $\theta^*$ and magnetic pole position estimate $\theta_{nf}$. An adder 131 calculates the difference between position command $\theta^*$ and magnetic pole position estimate $\theta_{nf}$, namely a position error $\epsilon$ and a position compensator 132 receives the position error $\epsilon$. The position compensator 132 amplifies the position error $\epsilon$. If the amplified position error $\epsilon$ exceeds a reference value $\theta_{ref}$ (for example, 90 degrees of electrical angle), output $\gamma$ is maintained constant (for example, 90 degrees of electrical angle). An adder 133 adds output $\gamma$ of the position compensator 132 to the magnetic pole position estimate $\theta_{nf}$ to output position control signal $\lambda$.

In the position controller 130, even if the position error $\epsilon$ exceeds the reference value $\theta_{ref}$, the motor excitation angle can be maintained constant with respect to magnetic pole position estimate $\theta_{nf}$ in the step-out limit, because output $\gamma$ is maintained constant. Hence, the stepping motor can avoid step-out as far as magnetic pole position estimation is possible.

The current controller 40 constitutes a current control means; the motor winding constant characteristic operators 153 and 154 constitute motor winding constant characteristic operation means; the adders 155 and 156 constitute differences operation means; the magnetic pole position estimation unit 150 constitutes a magnetic pole position estimation means; the adder 131 constitutes a position error operation means; the position compensator 132 constitutes a comparison means; and the differentiator 81 constitutes a speed command operation means.

Accordingly, phase currents $i_\alpha$ and $i_\beta$ are detected by the current sensors 61 and 62 and phase currents at zero speed $i_{0\alpha}$ and $i_{0\beta}$ are outputted by the motor winding constant characteristic operators 153 and 154 as first-order lag elements with a time constant equal to the winding constant. Because the stepping motor at zero speed may be considered as a series circuit with a winding resistance and a winding inductance, the motor current is first-order lag response to the applied voltage, which is determined by the winding constant. Hence, the motor winding constant characteristic operators 153 and 153 correspond to motor models at zero speed and their outputs respectively correspond to phase currents at zero speed $i_{0\alpha}$ and $i_{0\beta}$. The adder 155 (156) calculates the difference between phase current $i_\alpha$ ($i_\beta$) and phase current at zero speed $i_{0\alpha}$ ($i_{0\beta}$) and the arctangent operator 157 makes a calculation in accordance with Equation (20) to obtain magnetic pole position estimate $\theta_{nf}$. The coefficient multipliers 151 and 152 are elements which adjust a discrepancy between the zero speed state generated by electronic components as motor winding constant characteristic operators 153, 154 (zero speed motor models) and the zero speed state generated by an actual motor winding constant. The second term of Equation (2) can be obtained from speed command $\omega^*$ as the result of differentiation of position command $\theta^*$ and the motor winding constant. Therefore, the structure shown in FIG. 8 permits output of magnetic pole position estimate $\theta_{nf}$ which is calculated in accordance with Equation (20). In addition, since magnetic pole position $\theta$ is estimated according to continuously changing phase currents $i_\alpha$ and $i_\beta$ (detected phase current values $i_{\alpha f}$ and $i_{\beta f}$), it is possible to obtain magnetic pole position estimate $\theta_{nf}$ with high resolution.

The first term of Equation (20) expresses an angle proportional to speed electromotive forces $e_\alpha$ and $e_\beta$ and the second term of Equation (20) can also be obtained from an angular frequency as the result of differentiation of the first term of Equation (20) instead of differentiation of position command $\theta^*$, and the motor winding constant.

When calculation of Equation (20) is performed in a continuous system, magnetic pole position estimation can be done without a time lag; when it is performed in a discrete system, magnetic pole position estimation can be done with a lag of one sampling period required for speed calculation and calculation by first-order lag elements as motor winding constant characteristic operators. Consequently, the driver according to this embodiment can be applied to high speed rotation in a multi-phase hybrid stepping motor.

Because the motor winding constant characteristic operators 153 and 154 are first-order lag elements, when they each consist of a series circuit with a resistor and a capacitor the time constant of which is equal to that of the stepping motor 70 and voltages $V_\alpha$ and $V_\beta$ are applied to the series circuit to output the result of multiplication of the terminal voltage of the capacitor by a coefficient as an output signal, signals equivalent to phase currents at zero speed $i_{0\alpha}$ and $i_{0\beta}$ can be obtained. Hence, the motor winding constant characteristic operators 153 and 154 are very practical.

Inverter drive signals $V_{g\alpha}$ and $V_{g\beta}$ may be entered into the magnetic pole position estimation unit 150 instead of voltages $V_\alpha$ and $V_{62}$.

Regarding applied voltages $V_\alpha$ and $V_\beta$ and detected phase current values $i_{\alpha f}$ and $i_{\beta f}$, it is possible that coordinate transformation from multi-phase to 2-phase is made to obtain a 2-phase equivalent signal and the 2-phase equivalent signal is entered as a value corresponding to applied voltage and a detected phase current value into the magnetic pole position estimation means. Therefore, the present invention can be applied to stepping motors with different phases.

Figure 11:
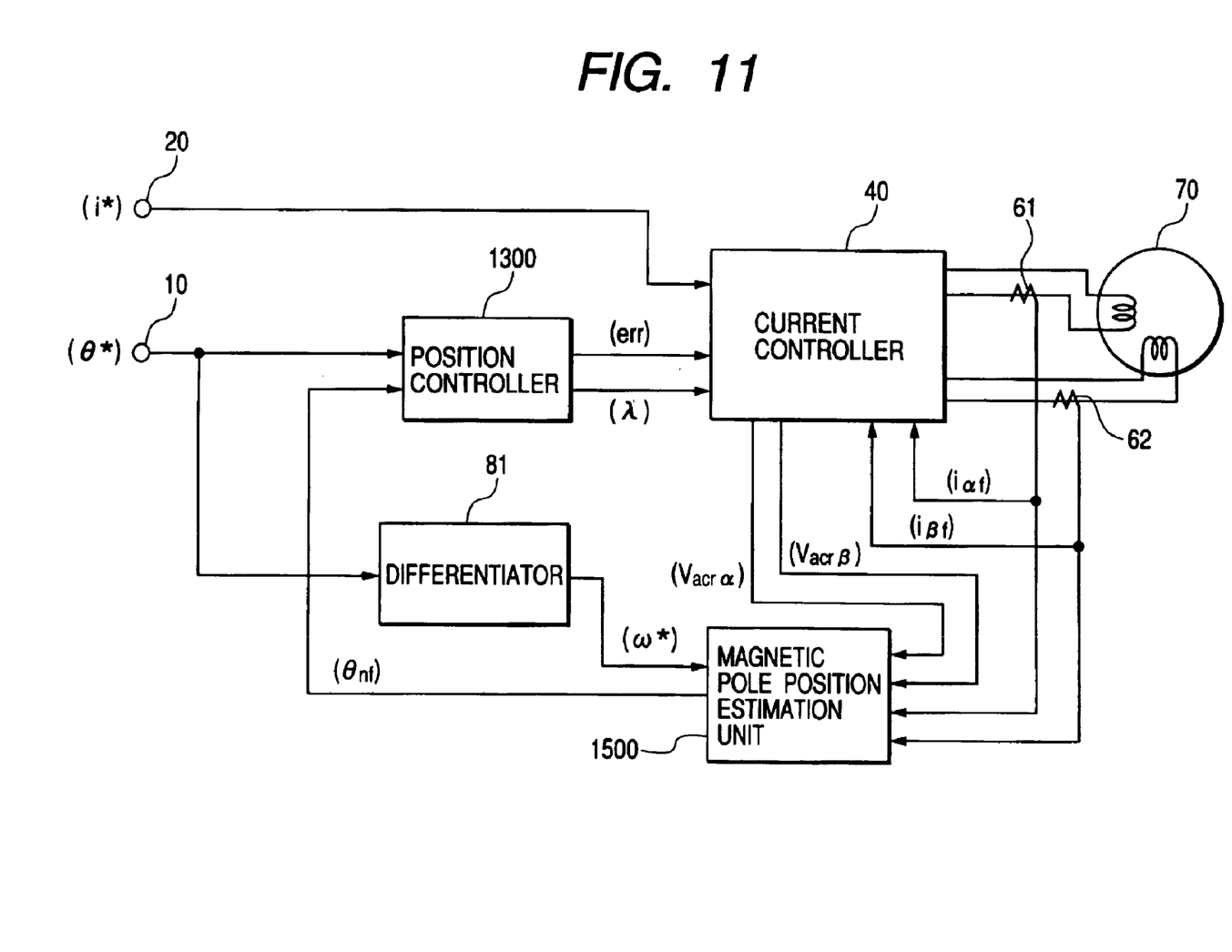
FIG. 11 is a block diagram showing a stepping motor driver according to a fourth embodiment of the present invention.

FIG. 11 shows the structure of a stepping motor driver according to a fourth embodiment of the present invention. In the driver shown in FIG. 11, the current controller 40 is the same as in the driver shown in FIG. 8 and the position controller and the magnetic pole position estimation unit are different from those in the driver in FIG. 8.

While the magnetic pole position estimation unit 150 of the driver in FIG. 8 receives voltages $V_\alpha$ and $V_\beta$ and detected phase current values $i_{\alpha f}$ and $i_\beta f$, the magnetic pole position estimation unit 1500 of the driver in FIG. 11 receives control voltages $V_{acr\alpha}$ and $V_{acr\beta}$ and detected phase current values $i_{\alpha f}$ and $i_{\beta f}$. The structure of the magnetic pole position estimation unit 1500 is the same as in the driver shown in FIG. 8. However, since the control voltages $V_{acr\alpha}$ and $V_{acr\beta}$ are proportional to voltages $V_\alpha$ and $V_\beta$, the gain of coefficient multipliers 151 and 152 in the magnetic pole position estimation unit 1500 is different from that in the driver in FIG. 8, namely their gain is 1/R multiplied by a coefficient. As mentioned above, outputs of the inverter 49 are $V_\alpha$ and $V_\beta$ and control voltages $V_{acr\alpha}$ and $V_{acr\beta}$ are proportional to voltages $V_\alpha$ and $V_\beta$. Hence, when control voltages $V_{acr\alpha}$ and $V_{acr\beta}$ are adjusted by coefficient multipliers 151 and 152 and then applied to the motor winding constant characteristic operators 153 and 154, it is possible to obtain signals equivalent to ones obtained with voltages $V_\alpha$ and $V_\beta$. However, while voltages $V_\alpha$ and $V_\beta$ include a dead time voltage to prevent shorting between the upper and lower arms of the inverter 49, control voltages $V_{acr\alpha}$ and $V_{acr\beta}$ do not include such a dead time voltage; therefore, when control voltages $V_{acr\alpha}$ and $V_{acr\beta}$ are used, it is desirable to make an adjustment, taking dead time into consideration.

Figure 12:
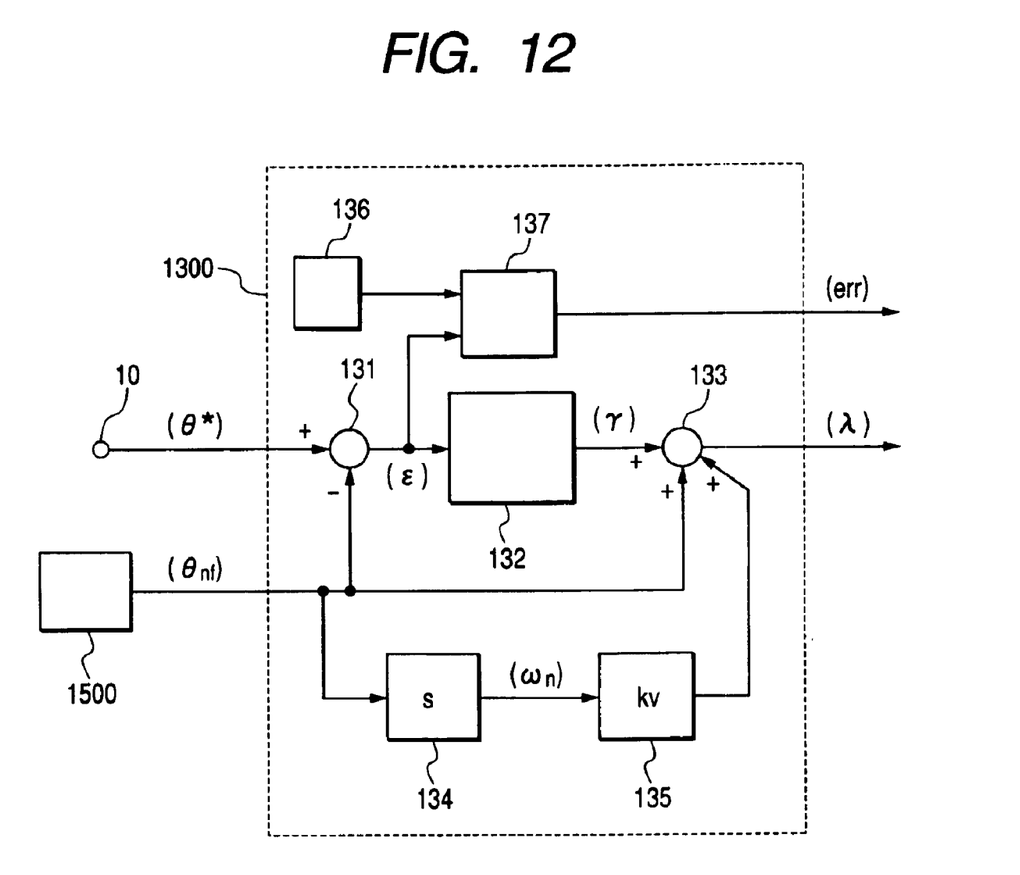
FIG. 12 is a block diagram showing a position controller in the driver shown in FIG. 11.

Regarding the position controller, in the driver shown in FIG. 8, position control signal $\lambda$ is obtained by adding an amplified value of position error $\epsilon$ to magnetic pole position estimate $\theta_{nf}$. On the other hand, in the driver shown in FIG. 11, an amplified value of position error $\epsilon$ and magnetic pole position estimate $\theta_{nf}$ differentiated by a differentiator 134 and multiplied by a coefficient multiplier 135 are added to magnetic pole position estimate $\theta_{nf}$ in a position controller 1300 to obtain position control signal $\lambda$, as shown in FIG. 12. This adjusts the excitation position of the stepping motor in response to speed variation. A comparator 137 compares position error $\epsilon$ with a reference as output of a reference generator 136 and, if the value of $\epsilon$ exceeds the reference, generates an excessive error signal err. The excessive error signal err is used as a signal which interrupts output of the current controller 40 and stops operation of the stepping motor 70.

The magnetic pole position estimation unit 1500 constitutes a magnetic pole position estimation means.

According to the present invention, an integrated circuit in the form of a microprocessor or the like may be used in calculating discrete values and a compact, inexpensive stepping motor driver can be realized.

What is claimed is:

1. A stepping motor driver comprising:
   a) a current control means which outputs values corresponding to applied voltages;
   b) current sensors which detect phase currents; and
   c) a magnetic pole position estimation means which has inverse function characteristic operation means of motor winding constant and speed electromotive force estimation means,
   wherein the magnetic pole position estimation means receives the values corresponding to applied voltages and a detected phase current values as outputs of the current sensors; the inverse function characteristic operation means receives the detected phase current value to perform the motor winding constant inverse function characteristic operation; and based on a difference between output of the inverse function characteristic operation means and the value corresponding to applied voltage, the speed electromotive force estimation means calculates speed electromotive force estimate to obtain a magnetic pole position estimate from the speed electromotive force estimates.

2. The stepping motor driver as claimed in claim 1, wherein the values corresponding to applied voltages are applied voltages.

3. The stepping motor driver as claimed in claim 1, wherein the values corresponding to applied voltages are control voltages.

4. The stepping motor driver as claimed in claim 1, wherein the values corresponding to applied voltages are inverter drive signals.

5. The stepping motor driver as claimed in claim 1, further comprising an input terminal for a position command, wherein the position command and the magnetic pole position estimate are used to control a motor excitation position.

6. The stepping motor driver as claimed in claim 1, wherein the magnetic pole position estimation means obtains the speed electromotive force estimates by discrete value calculation and also calculates the speed electromotive force estimates in accordance with state equations in which the second derivatives of the stepping motor speed electromotive forces are zero.

7. The stepping motor driver as claimed in claim 1, wherein pole placement is made in finite settling time.

8. The stepping motor driver as claimed in claim 1, wherein, regarding the values corresponding to applied voltages and the detected phase current values, coordinate transformation from multi-phase to 2-phase is made to obtain 2-phase equivalent signals and the 2-phase equivalent signals are entered as the values corresponding to applied voltages and the detected phase current values into the magnetic pole position estimation means.

9. A stepping motor driver comprising:
   a) a current control means which outputs values corresponding to applied voltages;
   b) current sensors which detect phase currents; and
   c) a magnetic pole position estimation means which has motor winding constant characteristic operation means and difference operation means,
   wherein the magnetic pole position estimation means receives the values corresponding to applied voltages and detected phase current values as outputs of the current sensors; the motor winding constant characteristic operation means calculates phase current at zero speed from the value corresponding to applied voltage; the difference operation means calculates a difference between the phase current at zero speed and the detected phase current value to obtain a magnetic pole position estimate from the differences.

10. The stepping motor driver as claimed in claim 9, wherein the values corresponding to applied voltages are applied voltages.

11. The stepping motor driver as claimed in claim 9, wherein the values corresponding to applied voltages are control voltages.

12. The stepping motor driver as claimed in claim 9, wherein the values corresponding to applied voltages are inverter drive signals.

13. The stepping motor driver as claimed in claim 9, further comprising an input terminal for a position command, wherein the position command and the magnetic pole position estimate are used to control a motor excitation position.

14. The stepping motor driver as claimed in claim 13, wherein the magnetic pole position estimation means adds a current phase angle with respect to a motor rotation speed as generated by winding time constant to a motor rotation angle which is obtained from the differences, to obtain the magnetic pole position estimate.

15. The stepping motor driver as claimed in claim 14, further comprising:

an input terminal for a position command;

a position error operation means which calculates a difference between the position command and a magnetic pole position estimate as output of the magnetic pole position estimation means; and a comparison means which detects that the position error exceeds a prescribed value.

16. The stepping motor driver as claimed in claim 15, further comprising a speed command operation means which calculates a speed command from the position command, wherein the magnetic pole position estimation means calculates the phase angle from the speed command.

17. The stepping motor driver as claimed in claim 14, wherein the magnetic pole position estimation means differentiates the motor rotation angle to obtain the phase angle.

18. The stepping motor driver as claimed in claim 9, wherein the motor winding constant characteristic operation means each consist of a series circuit having a resistor and a capacitor arranged so as to provide the same time constant as the motor winding constant and the value corresponding to applied voltage is applied to the series circuit to output the result of multiplication of the terminal voltage of the capacitor by a coefficient as an output signal.

19. The stepping motor driver as claimed in claim 9, wherein, regarding the values corresponding to applied voltages and the detected phase current values, coordinate transformation from multi-phase to 2-phase is made to obtain 2-phase equivalent signals and the 2-phase equivalent signals are entered as the values corresponding to applied voltages and the detected phase current values into the magnetic pole position estimation means.

* * * * *